US012631818B2

(12) United States Patent
Wang et al.

(10) Patent No.: US 12,631,818 B2
(45) Date of Patent: May 19, 2026

(54) DISPERSION COMPENSATION MICRO-STRUCTURED OPTICAL FIBER

(71) Applicant: YANSHAN UNIVERSITY, Qinhuangdao (CN)

(72) Inventors: Wei Wang, Qinhuangdao (CN); Chang Zhao, Qinhuangdao (CN); Xiaochen Kang, Qinhuangdao (CN); Hongda Yang, Qinhuangdao (CN); Wenchao Li, Qinhuangdao (CN); Zheng Li, Qinhuangdao (CN); Lin Shi, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 292 days.

(21) Appl. No.: 18/393,701

(22) Filed: Dec. 22, 2023

(65) Prior Publication Data

US 2024/0134114 A1 Apr. 25, 2024

Related U.S. Application Data

(63) Continuation of application No. PCT/CN2022/112966, filed on Aug. 17, 2022.

(30) Foreign Application Priority Data

Nov. 18, 2021 (CN) .......................... 202111366621.8

(51) Int. Cl.
*G02B 6/02* (2006.01)

(52) U.S. Cl.
CPC ................................. *G02B 6/02366* (2013.01)

(58) Field of Classification Search
CPC ....................................................... G02B 6/02

(Continued)

(56) References Cited

U.S. PATENT DOCUMENTS 6,845,204 B1 * 1/2005 Broeng ................. C03B 37/028
385/125
7,054,524 B2 * 5/2006 Miller .................... B82Y 20/00
385/28

(Continued)

FOREIGN PATENT DOCUMENTS

CN 104238001 A * 12/2014 ............. G02B 1/048
CN 209265000 U 8/2019

(Continued)

OTHER PUBLICATIONS

Internation Search Report of PCT/CN2022/112966, Mailed Nov. 1, 2022.

(Continued)

*Primary Examiner* — Kaveh C Kianni

(57) ABSTRACT

A dispersion-compensation microstructure fiber uses pure silica glass as the background material. It includes the core, the first-type defects, the second-type defects and the cladding. The air holes in the fiber cross section are arranged in the equilateral triangle lattice with the same adjacent air-hole to air-hole spacing. The core is formed by omitting 1 air hole. The first-type defects are formed by the 6 air holes locating at the vertices of hexagonal third-layer porous structure surrounding the core and their surrounding background material. The second-type defects are formed by the air holes in the first air-hole layer surrounding each first-type defect and their surrounding background material. The second-type defects act as the porous structure to surround the first-type defects and the fundamental defect modes, and can also combine with the first-type defects to act as the core of the second-order defect modes.

4 Claims, 3 Drawing Sheets

(58) Field of Classification Search
USPC ........................................................ 385/125
See application file for complete search history.

(56)                    References Cited

U.S. PATENT DOCUMENTS

| | | | | |
|---|---|---|---|---|
| 9,977,180 | B2 * | 5/2018 | Hoppe ................... | G02B 6/102 |
| 2001/0055455 | A1 | 12/2001 | Hasegawa et al. | |
| 2002/0172456 | A1 * | 11/2002 | Hosomi ............ | G02B 6/29317 |
| | | | | 385/27 |
| 2004/0033043 | A1 * | 2/2004 | Monro ................... | G02B 6/105 |
| | | | | 65/393 |
| 2005/0069269 | A1 | 3/2005 | Libori et al. | |
| 2009/0020499 | A1 * | 1/2009 | Nottola ................... | G02B 6/42 |
| | | | | 216/2 |
| 2010/0046560 | A1 | 2/2010 | Liu | |

FOREIGN PATENT DOCUMENTS

| | | | | | | |
|---|---|---|---|---|---|---|
| CN | 114035264 | A | | 2/2022 | | |
| JP | H1095628 | A | * | 4/1998 | ............ | B82Y 20/00 |
| JP | 2002145634 | A | * | 5/2002 | | |
| JP | 2005538029 | A | * | 12/2005 | ............ | G02B 6/032 |
| JP | 2009015294 | A | * | 1/2009 | ......... | G02B 6/02361 |
| WO | WO-03009028 | A1 | * | 1/2003 | ......... | G02B 6/02361 |

OTHER PUBLICATIONS

T. A. Birks et al., IEEE Photonics Technology Letters, Dispersion Compensation Using Single-Material Fibers, Jun. 1999, pp. 674-676, vol. 11, Issue 6.

Yang Sigang et al., Optics Express, Theoretical study and experimental fabrication of high negative dispersion photonic crystal fiber with large area mode field, Apr. 3, 2006, pp. 3015-3023, vol. 14, Issue 7.

F. Gérôme et al., Optics Letters, Design of dispersion-compensating fibers based on a dual-concentric-core photonic crystal fiber, Dec. 1, 2004, pp. 2725-2727, vol. 29, Issue 23.

Song Zhaoyuan et al., Brazilian Journal of Physics, Study on Dual-Concentric-Core Dispersion Compensation Photonic Crystal Fiber, Sep. 2009, pp. 519-522, vol. 39, Issue 3.

Zhang Yani, Acta Physica Sinica, Design and optimization of low-loss low-nonlinear high negative-dispersion photonic crystal fiber, 2012, pp. 261-267, vol. 61, Issue 8.

Zhang Xiaolei et al., Journal of the Optical Society of America A, In-phase supermode selection in ring-type and concentric-type multicore fibers using large-mode-area single-mode fiber, May 2011, pp. 924-933, vol. 28, Issue 5.

Qi Xue et al., Optical Engineering, Design and analysis of seven-core photonic crystal fiber for high-power visible supercontinuum generation, Jun. 2015, pp. 066102-1-066102-6, vol. 54, Issue 6.

* cited by examiner

DISPERSION COMPENSATION MICRO-STRUCTURED OPTICAL FIBER

CROSS-REFERENCE TO RELATED APPLICATIONS

This application is a continuation of International Patent Application No. PCT/CN2022/112966 with a filing date of Aug. 17, 2022, designating the United States, now pending, and further claims priority to Chinese Patent Application No. 202111366621.8 with a filing date of Nov. 18, 2021. The content of the aforementioned applications, including any intervening amendments thereto, are incorporated herein by reference.

TECHNICAL FIELD

The invention relates to the field of optical fiber communication, in particular to a dispersion-compensation microstructure fiber (DC-MSF).

BACKGROUND

In the fields of telecommunications, electric power transmission system, broadcasting and other areas, single-mode fiber is widely used as the media to transmit optical signal. However, the positive dispersion accumulated in it broadens the signal pulse. The dispersion-compensation fiber is a kind of fiber that has negative dispersion with large absolute values. It has the ability to compensate the accumulated positive dispersion in a very long single-mode fiber within a short fiber length. By dispersion-compensation fiber, the total dispersion on the entire optical fiber link can be adjusted to approximately zero to achieve high-speed, large-capacity and long distance communication.

The microstructure fiber (MSF) is a kind of fiber which has micropores in its cross section. The diameters of those micropores are on the order of the wavelength. To flexibly design on their structure, many MSFs with dispersion-compensation property has been proposed. They can be mainly classified in to two categories.

In the first category, the fiber has only one core. By optimizing the fiber structure, the waveguide dispersion can be adjusted to achieve dispersion compensation property. For example, T. A. Birks et al. fabricated a DC-MSF. It has a large negative dispersion that one unit length of this DC-MSF can compensate the dispersion of more than 100 times the length of the standard fiber at a single wavelength (T. A. Birks, et al. Dispersion compensation using single-material fibers[J]. IEEE photonics technology letters, 1999, 11(6): 674-676). Huang Tianye and Wei Qian proposed a DC-MSF with an ultra-flatten dispersion. This fiber uses ZBLAN fluoride as the background material. There is an air hole in the center, and the innermost air-hole ring and the cladding air holes are distributed outside it. This fiber achieves flatten dispersion around 2 μm band, and can be used for wideband dispersion compensation (Huang Tianye, Wei Qian. An ultra-flatten dispersion-compensation microstructure fiber using ZBLAN fluoride: China, CN201821987796.4[P].2019-08-16).

In the second category, the fiber has more than one core. This kind of fiber uses the mode coupling as its operating mechanism. When the strong energy coupling between the inner core mode and outer core (also called defect) mode occurs, the refractive index of the inner core mode has a sudden change at the resonant wavelength. This results in a negative dispersion with large absolute values in the inner core mode. One of the technical schemes is the fiber with a coaxial dual-core structure. An outer ring core coaxial with the center of the inner core is constructed by omitting or shrinking the air holes in a certain air-hole layer in the cladding. For examples, Yang Sigang et al., F. Gérôme et al., Md. Selim Habib et al. and Zhang Yani et al. have all used this technical scheme to design DC-MSFs in the communication band. (Yang Sigang, et al. Theoretical study and experimental fabrication of high negative dispersion photonic crystal fiber with large area mode field[J]. Optics express, 2006, 14(7):3015-3023. F. Gérôme, J.-L. Auguste, J. M. Blondy. Design of dispersion-compensating fibers based on a dual-concentric-core photonic crystal fiber[J]. Opt Lett, 2004, 29(23): 2725-7. Md. Selim Habib, Md. Samiul Habib, S. M. A. Razzak. Study on Dual-Concentric-Core Dispersion Compensating Photonic Crystal Fiber[J]. International journal of engineering & technology (Dubai), 2012, 1(4): 377. Zhang Yani. Design and optimization of low-loss low-nonlinear high negative-dispersion photonic crystal fiber[J]. Acta Physica Sinica, 2012, 61(08): 261-267). Another commonly used technical scheme is that the fiber has several outer cores (or defects). For example, Wang Wei and Zhao Chang et al invented a DC-MSF. In their invention, 6 hollow ring shape outer cores are constructed on the fourth layer of the porous cladding surrounding the inner core. In-phase supermode of the outer core is coupled to the inner core mode to achieve dispersion-compensation property in the inner core mode (Wang Wei, Zhao Chang, et al. A microstructure fiber for dispersion compensation: China, CN202111184780.6[P]). Another example is a DC-MSF invented by Wang Wei and Kang Xiaochen et al. In this invention, the cladding defects on the x-axis and the cladding defects on the y-axis are formed by shrinking the air holes. The values of the refractive indices of defect modes are matched with that of the x-polarized and y-polarized modes of the rectangular core at almost the same specific wavelength. At the same time, the slopes of the curves of the refractive indices to the wavelength of the two defect modes are mismatched with that of the x-polarized and y-polarized modes of the rectangular core. By these methods, this invention is capable of maintaining the polarization of the core modes. Besides, both polarized core modes generated negative dispersion with large absolute values at 1550 nm (Wang Wei, Kang Xiaochen, et al. A single core polarization maintaining dispersion compensation microstructure fiber: China, CN202110969178.7[P]. 2022-05-24).

To construct multiple cores in MSF, some other effects can be generated by the mode coupling mechanism. For example, Xiaolei Zhang et al. studied the supermodes in two typical multicore fibers, namely, the ring-type and the concentric-type multicore fiber. Then, they generated the supermodes as many as the number of the cores in these fibers. (Xiaolei Zhang, Xingyu Zhang, et al. In-phase supermode selection in ring-type and concentric-type multicore fibers using large-mode-area single-mode fiber[J]. J. Opt. Soc. Am. A Opt Image Sci Vis, 2011,28(5): 924-33). Xue Qi et al. studied a seven-core MSF. Their study shows that the in-phase supermode generated by the coupling of seven cores has many properties, such as an even distributed mode field, etc. (Xue Qi, Sheng-Ping Chen, et al. Design and analysis of seven-core photonic crystal fiber for high-power visible supercontinuum generation[J]. Optical Engineering, 2015, 54(6): 066102).

SUMMARY OF PRESENT INVENTION

In this invention, the defect is constructed by shrinking 7 air holes. There are totally 6 defects symmetrical distributed in the cladding. Under the combined action of a series of technical schemes, each defect generated two types of defect modes, which are the defect supermode and the second-order defect mode. By controlling the refractive indices of those two modes, the values of the refractive indices of the two defect modes are matched with that of the core mode at 2 wavelengths respectively. At the same time, the slopes of the curves of the refractive indices to the red-shift of wavelength of the two defect modes are mismatched with that of the core mode. As a result, the core mode generates negative dispersion with large absolute values at both wavelengths, which can compensate the positive dispersion accumulated in the front-end single-mode fiber. In order to achieve the above-mentioned technical effects, the technical schemes in this invention have solved the following three technical problems simultaneously.

(1) Two types of defect modes are formed in the defect.

In this invention, the DC-MSF uses pure silica glass as the background material. The air holes in the fiber cross section are arranged in equilateral triangle lattice, with the same adjacent air-hole to air-hole spacing. By this method, porous pure silica glass structure arranged in hexagonal lattice is constructed. By controlling the air-hole to air-hole spacing and the air-hole diameter, the area ratio between the air holes and pure silica glass background is adjusted. In turn, the equivalent refractive index at the specific location of the fiber, which is the average refractive index calculated by the area ratio between the air holes and their surrounding silica glass background, is controlled. Initially, the air holes have the same diameter. Then, totally 6 defects are symmetrical constructed in the cladding. Each one is constructed by shrinking 7 air holes. The details are as follows. Firstly, shrink the air hole locating at each vertex of the third hexagonal porous layer surrounding the core to make it the smallest among all the air holes. The first-type defect is formed by the air hole at the vertex and their surrounding pure silica glass background. The refractive index of the first-type defect is the average refractive index of the air and pure silica, averaged by the area ratio between the air hole at the vertex and its surrounding silica glass background. Secondly, shrink the 6 air holes in the first air-hole layer surrounding each first-type defect. Set their diameter smaller than the diameter of the air holes in the cladding, but larger than the diameter of the air holes in the first-type defects. The second-type defect is formed by the above-mentioned 6 air holes and their surrounding pure silica glass background. The refractive index of the second-type defect is the average refractive index of the air and pure silica, averaged by the area ratio between the above-mentioned 6 air holes and their surrounding silica glass background. Its value is lower than the refractive index of the first-type defect, but higher than the refractive index of the cladding, which is the average refractive index of the air and pure silica, averaged by the area ratio between the air holes in the cladding and their surrounding silica glass background. The above-mentioned 6 defects, which has C6v symmetry with the center of the core as the midpoint, cause no birefringence in the core mode.

The above technical schemes result in the following technical effects. One kind of waveguides is formed by each first-type defect as the defect core, and the combination of the second-type defect and the cladding as the porous structure surrounding the defect core. At the same time, another kind of waveguides is also formed. Its defect core, which has a ring shape, is formed by combining all the first-type defects and the second-type defects as a whole. Then, the cladding acts as the porous structure surrounding this annular defect core.

Each first-type defect acts as one defect core, while the second-type defect and the cladding work together as the porous structure surrounding this defect core. By this method, a waveguide is formed. The shortest path between two adjacent first-type defects goes through at least 2 air holes, which belong to the second-type defects and locate at the third hexagonal porous layer surrounding the core. Because of this, there are totally 6 defect cores that are structurally independent, and they are symmetrically distributed at the cross section of the fiber. Each defect core individually supports a mode, namely the fundamental defect mode. For this mode, the upper limit of its refractive index is the average refractive index of the first-type defect. The lower limit of its refractive index is the average refractive index of the second-type defect and the cladding, averaged by their area ratio. However, the energy of the fundamental defect mode leaks out through the two air holes of the second-type defect, then couples with the adjacent fundamental defect mode. To set the diameter of the air holes in the cladding largest among all the air holes, this technical scheme guides the light energy in the fundamental defect modes to leak through those above-mentioned two air holes. This enhances the coupling strength between the adjacent fundamental defect modes. As a result, the fundamental defect modes in 6 defect cores evolve into 1 defect supermode. Its energy spreads over all the air holes in the third layer surrounding the core where include 6 air holes in the first-type defects and 12 air holes in the second-type defects, and the silica glass background surrounding them. In other words, the defect supermode has an integrated light field with hexagonal distribution. Although the defect supermode has the same upper and lower limit of the refractive index compared with the fundamental defect mode, its refractive index is higher than the refractive index of the fundamental defect mode under the impact of the energy coupling.

The first-type defects and the second-type defects work together as the defect core, while the cladding acts as the porous structure surrounding this annular defect core. By this method, a waveguide is also formed. Two adjacent second-type defects are in contact with each other without any air holes blocking in between. So, the totally 6 defects are structurally connected. Because of this, one annular defect core is formed by 6 air holes in the first-type defects, 36 air holes in the second-type defects and their surrounding silica glass background. This annular defect core supports a mode, which has an integrated light field with ring shape. For this mode, the upper limit of its refractive index is the average refractive index of the first-type defect and the second-type defect, averaged by their area ratio. The lower limit of its refractive index is the average refractive index of the cladding. The upper and lower limits are respectively lower than those of the defect supermode, whose value is described in the previous paragraph. Therefore, the refractive index of the mode supported in the annular defect core is lower than that of the defect supermode at every wavelength. The mode supported in the annular defect core is the second-order defect mode.

By the above-mentioned technical schemes, the second-type defects act as both the porous structure to surround the fundamental defect modes and the core of the second-order defect modes in this invention. By this method, two different defect waveguides are formed by one defect structure. The technical effect of generating two types of defect modes, namely the defect supermode and the second-order defect mode, in one defect, is achieved.

(2) Using one defect structure, the values of the refractive indices of the defect supermode and the second-order defect mode are respectively matched with that of the core mode at 2 different wavelengths. At the same time, the slopes of the curves of the refractive indices to the red-shift of wavelength of the two defect modes are both mismatched with that of the core mode.

In this invention, the energy is concentrated more tightly in its own core area at shorter wavelength for all the core mode and defect modes. As the wavelength becomes longer, energy gradually leaks out to the porous structure surrounding the core area. As a result, the values of the refractive indices of each mode decrease as the wavelength increases. In other words, the slopes of the curves of the refractive indices to the red-shift of wavelength of all the modes are negative.

In this invention, the pure silica glass core is constructed by omitting the air hole locating at the center of the porous structure surrounded by 6 defects in the cladding. The cladding acts as the porous structure surrounding the core. The upper limit of the refractive index of the core mode is the refractive index of pure silica glass, whose value is the largest among the refractive indices of all the regions in this invention. The lower limit of the refractive index of the core mode is the average refractive index of the cladding, whose value is the smallest among the refractive indices of all the regions in this invention. Therefore, the absolute value of the slope of the curve of the refractive index to the red-shift of wavelength of the core mode is the largest compared with all the other modes. In addition, because all the air holes have the same adjacent air-hole to air-hole spacing, to set the diameter of the air holes in the cladding the largest among all the air holes makes the diameter of the core the smallest compared with all the other cores. This technical scheme reduces the refractive index of the core mode, and this effect is more obvious at longer wavelengths. As a result, the absolute value of the slope of the curve of the refractive index to the red-shift of wavelength of the core mode is further increased.

As stated in (1), the upper limit of the refractive index of the defect supermode is the average refractive index of the first-type defect. It is smaller than the upper limit of the refractive index of the core mode. The lower limit of the refractive index of the defect supermode is the average refractive index of the second-type defect and the cladding, averaged by their area ratio. It is larger than the lower limit of the refractive index of the core mode. In terms of the value, the interval of the refractive index of the core mode includes that of the defect supermode. In terms of the slope, the absolute value of the slope of the curve of the refractive index to the red-shift of wavelength of the core mode is larger than that of the defect supermode. When the adjacent fundamental defect modes couples to form the defect supermode, the coupling strength is stronger at longer wavelengths. As a result, the refractive index of the defect supermode has a larger increase at longer wavelengths, which further reduces the absolute value of the slope of the curves of the refractive index to the red-shift of wavelength of the defect supermode. Then, the difference between the absolute values of the slope of the curve of the refractive index to the red-shift of wavelength of the defect supermode and the core mode is increased. Under the combination actions of all these technical schemes, the curves of the refractive indices to the red-shift of wavelength of the defect supermode and the core mode are controlled to intersect at the first resonant wavelength (In other words, the values of the refractive indices of the defect supermode and the core mode are matched). At the same time, the difference between the absolute values of the slopes of the two curves are increased. (In other words, the slopes of the two are mismatched.)

Also stated in (1), the upper limit of the refractive index of the second-order defect mode is the average refractive index of the first-type defect and the second-type defect, averaged by their area ratio. It is smaller than the upper limit of the refractive index of the core mode. The lower limit of the refractive index of the second-order defect mode is the average refractive index of the cladding. It equals to the lower limit of the refractive index of the core mode. In terms of the value, the interval of the refractive index of the core mode includes that of the second-order defect mode. In terms of the slope, the absolute value of the slope of the curve of the refractive index to the red-shift of wavelength of the core mode is larger than that of the second-order defect mode. The totally 6 defects are structurally connected to form a whole annular core. Because the area of each defect is about 7 times of the core area, the area of the annular core is about 42 times as large as the area of the core. Larger core area significantly enhances the confinement ability of light energy at longer wavelengths. This results in the increase of the refractive index of the second-order defect mode at longer wavelengths. As a result, the absolute value of the slope of the curves of the refractive index to the red-shift of wavelength of the second-order defect mode is decreased. The difference between the absolute value of the slopes of the curves of the refractive index to the red-shift of wavelength of the second-order defect mode and the core mode is further increased. Therefore, by one defect structure, this invention achieves other technical effect that the curves of the refractive indices to the red-shift of wavelength of the second-order defect mode and the core mode are controlled to intersect at the second resonant wavelength.

In addition, as stated in (1), the refractive index of the second-order defect mode is smaller than that of the defect supermode at every wavelength. Therefore, the second resonant wavelength is larger than the first resonant wavelength.

(3) The positions of the two resonant wavelengths are controlled by one defect structure.

As stated in (2), to control the refractive index of the core mode, the following four technical schemes are used. The core is formed by omitting 1 air hole. The cladding acts as the porous structure surrounding the core. The value of the adjacent air-hole to air-hole spacing is controlled. The diameter of the air holes in the cladding is set to be the largest among all the air holes.

On this basis, a variety of technical schemes are used to control the refractive indices of the defect supermode and the second-order mode. This in turn controls the positions of the resonant wavelengths at where the defect supermode and the second-order mode resonate with the core mode. These technical schemes are as follows. Firstly, retaining but reducing the air holes in the first-type defects can reduce the upper limit of the refractive indices of both defect supermode and second-order defect mode. This further reduces the refractive indices of the two defect modes, resulting in the red shift of the two resonant wavelengths. Secondly, the diameter of air holes in the second-type defects is larger than that in the first-type defects, but smaller than that in the cladding. As a result, the average refractive index of the second-type defects is smaller than that of the first-type defects, but larger than that of the cladding. The second-type defect works as the porous structure surrounding the fundamental defect mode, together with the cladding. It has both the technical effects of raising the lower limit of the refractive index of the fundamental defect mode and increasing the diameter of the core region of the fundamental defect mode. These further increase the refractive index of the fundamental defect mode, resulting in blue shift of the first resonant wavelength. The second-type defect also works as the defect core of the second-order defect mode, together with the first-type defect. It reduces the upper limit of the refractive index of the second-order defect mode, which in turn reduces the refractive index of the second-order defect mode. This results in red shift of the second resonant wavelength. Thirdly, as stated in (1), the energy of the fundamental defect mode first leaks out through the two air holes in the second-type defect, which locate at the third hexagonal porous layer surrounding the core. Then, it couples with the energy in adjacent fundamental defect mode to form the defect supermode. The defect supermode's refractive index is larger than the refractive index of the fundamental defect mode. This results in blue shift of the first resonant wavelength. By the combination actions of all the above technical schemes, the technical effect of controlling the positions of the two resonant wavelengths by one defect structure is achieved.

In this invention, after solving the above three technical problems, the defect supermode and the second-order defect mode with the core mode at different wavelength. The resonance causes sudden changes on the curve of the refractive index to the red-shift of wavelength of the core mode at the two resonant wavelengths. This results in negative dispersion with large absolute values in the core mode. The positive dispersion accumulated in the front-end single-mode fiber could be compensated at both wavelengths.

To solve the above technical problems, the technical schemes of this invention are as follows.

It is a dispersion-compensation microstructure fiber using pure silica glass as a background material, comprising a core, the first-type defects, the second-type defects and a cladding. The core is a solid area formed by omitting 1 air hole.

The air holes in the fiber cross section are arranged in an equilateral triangle lattice, with a spacing between adjacent air-holes being $\Lambda$. The first-type defects are formed by 6 air holes locating at vertices of hexagonal third-layer porous structure surrounding the core and their surrounding background material. The diameter of each of the 6 air holes is d3. The second-type defects are formed by the air holes in the first air-hole layer surrounding each first-type defect and their surrounding background material. The second-type defects include a total of 36 air holes each with a diameter d2. The cladding is formed by the air holes surrounding the core and the second-type defects and their surrounding background material. The diameter of the air holes in the cladding is d1. The above mentioned three diameters satisfy the relationship of d1>d2>d3.

Further, the spacing $\Lambda$ is in a range of 1.98-2.02 μm.
Further, the diameter d3 is in a range of 0.385-0.425 μm.
Further, the diameter d2 is in a range of 0.99-1.03 μm.
Further, the diameter d1 is in a range of 1.33-1.37 μm.

This invention is about a DC-MSF. When each first-type defect acts as the core of the defect supermode and the second-type defect and the cladding work together as the porous structure surrounding this mode, a waveguide is formed. Meanwhile, when the first-type defects and the second-type defects work together as the core of the second-order defect mode and the cladding acts as the porous structure surrounding this mode, another waveguide is formed. By these method, one defect structure forms two different defect waveguides, in which two types of defect modes, namely the defect supermode and the second-order defect mode, are generated. By controlling both the values of the refractive indices and slopes of the curves of the refractive indices to the red-shift of wavelength of the defect supermode and the second-order defect mode, the values of the refractive indices of the two defect modes are matched with that of the core mode, and the slopes of the curves of the refractive indices to the red-shift of wavelength of the two defect modes are mismatched with that of the core mode. As a result, strong energy coupling between the core mode and the two defect modes is achieved at the resonant wavelengths. This energy coupling further results in the technical effect of generating negative dispersion with large absolute values at both resonant wavelengths in the core mode. Hence, this fiber has the ability of compensating the positive dispersion accumulated in the front-end single-mode fiber at both resonant wavelengths. Compared with the existing technology, this invention has the following advantages. Compared with those non-birefringent DC-MSFs that can compensate the dispersion at only one wavelength, the DC-MSF proposed by this invention generates two types of defect modes in one defect, namely the defect supermode and the second-order defect mode. The two modes resonate with the core mode at 2 wavelengths respectively. As a result, the core mode generates negative dispersion with large absolute values and can compensate the positive dispersion accumulated in the front-end single-mode fiber at both resonant wavelengths. In other polarization-maintaining dispersion-compensation microstructure fibers, the core mode also resonates twice with the cladding mode, resulting in negative dispersion with large absolute values. However, these schemes introduce birefringence in the core mode. The twice resonance is achieved by two different polarized core modes, with each polarized core mode resonating only once with the cladding mode. Therefore, the negative dispersion generated by those schemes is related to the polarized states of the core mode. The core mode can only compensate the positive dispersion accumulated in the same polarized mode of the front-end single-mode fiber. In this invention, neither the fiber structure nor the resonance between the defect mode and the core mode causes birefringence in the core mode. Therefore, the core mode can compensate the positive dispersion accumulated in both polarized modes of the front-end single-mode fiber at both resonant wavelengths.

By all the technical schemes proposed in this invention, an example is presented below. The dispersion value of the core mode is −3312 ps/(nm·km) at 1552 nm. The dispersion value of the core mode is −6065 ps/(nm·km) at 1571 nm.

DETAILED DESCRIPTION OF THE EMBODIMENTS

To better illustrate the technical schemes of the embodiments and related technical schemes, the diagrams in the section of the embodiments and the technical schemes' description are explained below. Obviously, the designs presented in the following section are merely some examples of this invention. Other designs can be obtained without creative efforts from these drawings for the practitioners in the field.

Figure 1:
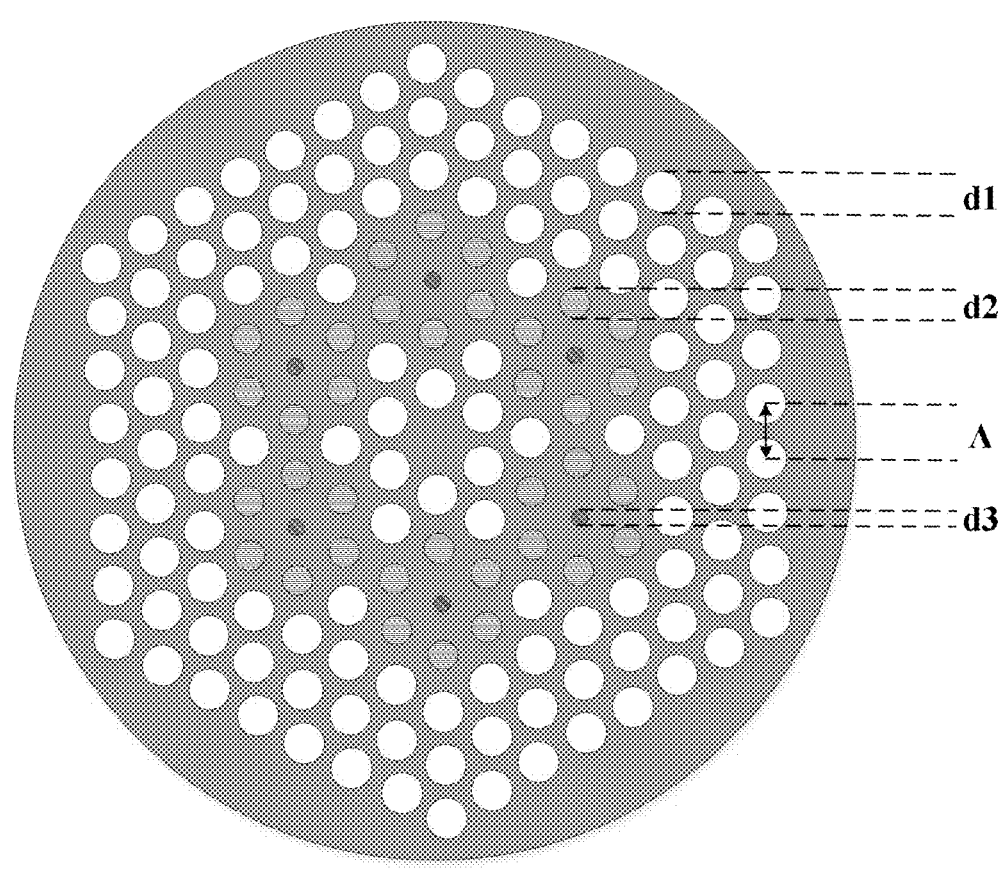
FIG. 1 shows the schematic of the cross-section according to one embodiment of the disclosure.

The detailed structures of an example about the invented DC-MSF are presented in FIG. 1. It uses pure silica glass as a background material, comprising a core, the first-type defects, the second-type defects and a cladding. The core is a solid area formed by omitting 1 air hole. The air holes in a fiber cross section are arranged in an equilateral triangle lattice, with a spacing between adjacent air-holes being $\Lambda$ in a range of 1.98-2.02 μm. In this example, $\Lambda$=2 μm. The first-type defects are formed by 6 air holes locating at vertices of hexagonal third-layer porous structure surrounding the core and their surrounding background material. The diameter of each of the 6 air holes is d3 in a range of 0.385-0.425 μm. In this example, d3=0.405 μm. The second-type defects are formed by the air holes in the first air-hole layer surrounding each first-type defect and their surrounding background material. The second-type defects include a total of 36 air holes each with a diameter d2 in a range of 0.99-1.03 μm. In this example, d2=1.01 μm. The cladding is formed by the air holes surrounding the core and the second-type defects and their surrounding background material. The diameter of the air holes in the cladding is d1 in a range of 1.33-1.37 μm. In this example, d1=1.35 μm. The above mentioned three diameters satisfy the relationship of d1>d2>d3.

The specific technical schemes of this patent can be described as:

In this invention, the fiber structure has the following parameters. The core omits 1 air hole. The adjacent air-hole to air-hole spacing is $\Lambda$. The diameter of the air holes in the cladding is d1. The centers of the defect structure locate at the 6 vertices of hexagonal third-layer porous structure surrounding the core. The diameter of the air holes in the first-type defects is d3. The diameter of the air holes in the second-type defects is d2.

For a triangle arranged air-hole array, the average refractive index by the area ratio between the air holes and its surrounding silica glass background in a cell is $$\left[1 - \frac{\sqrt{3}\,\pi}{6}\left(\frac{di}{\Lambda}\right)^2\right] n_{silica} + \frac{\sqrt{3}\,\pi}{6}\left(\frac{di}{\Lambda}\right)^2 n_{air}$$

(where $n_{silica}$ represents the refractive index of pure silica glass, $n_{air}$ represents the refractive index of air whose value is 1.0; di is the diameter of the air hole in the cell). When di is taken as d1, d2 and d3, it corresponds to the refractive index of the cladding, the first-type defects, and the second-type defects, respectively. The average refractive index of the first-type defects and the second-type defects, averaged by their area ratio, is $$\left[1 - \frac{d3^2 + 6d2^2}{(4\Lambda - d1)^2}\right] n_{silica} + \frac{d3^2 + 6d2^2}{(4\Lambda - d1)^2} n_{air}.$$

The above-mentioned parameters also affect the diameter, area and spacing of the core and the defect core which is in the cladding. The diameter of the defect core is 2$\Lambda$–d1, and the area is $$\pi\left(\Lambda - \frac{d1}{2}\right)^2.$$

One kind of waveguides is formed by each first-type defect as the defect core, and the combination of the second-type defect and the cladding as the porous structure surrounding the defect core. The diameter of the defect core is 2$\Lambda$–d2, and the area is $$\pi\left(\Lambda - \frac{d2}{2}\right)^2.$$

Another kind of waveguides is also formed by the combination of the first-type defects and the second-type defects as the core, and the cladding as the porous structure surrounding the defect core. By this time, in the core region, the ring width at the 6 vertices is the widest, which is 4$\Lambda$–d1. The ring width at the length of the 6 sides is the narrowest, which is $\sqrt{3}\Lambda$–d1. The area of the defect core is $$6\pi\left(2\Lambda - \frac{d1}{2}\right)^2.$$

The spacing from the center of the defect structure to the center of the core is 3$\Lambda$, and the spacing between the centers of two adjacent defect structures is also 3$\Lambda$.

According to the influence of the above-mentioned parameters in this invention, it can be known:

(1) $\Lambda$ is the adjacent air-hole to air-hole spacing shared by all air holes, including the air holes in the first-type defects, the air holes in the second-type defects, and the air holes in the cladding. To reduce $\Lambda$ will generate the following technical effects. Firstly, the diameter and the area of the core and the defect core in the cladding are reduced at the same time. As a result, the values of the refractive indices of each mode in all core regions are reduced, and the absolute value of the slopes of the curves of the refractive indices to the red-shift of wavelength of these core regions are increased. Secondly, the technical scheme reduces both the lower limit of the refractive index of the core mode, and the upper limit and the lower limit of the refractive indices of the defect supermode and the second-order defect mode. As a result, this reduces the values of the refractive indices of these three modes at the same time, and increases the absolute value of the slope of the curve of the refractive index to the red-shift of wavelength of the core mode. Thirdly, the distance between the adjacent defect cores and the distance between each of the defect core and the core are reduced. To reduce the distance between the adjacent defect cores enhances the coupling strength between the adjacent fundamental defect modes, and increases the value of the refractive index of the defect supermode. In addition, the coupling strength between the adjacent fundamental defect modes is stronger at longer wavelengths. As a result, the refractive index of the fundamental defect mode has a larger increase at longer wavelengths, which further reduces the absolute value of the slope of the curve of the refractive index to the red-shift of wavelength of this mode. The above two factors result in bule shift of the first resonant wavelength. To reduce the distance between each of the defect core and the core enhances the resonance strength between two defect modes, namely the defect supermode and the second-order defect mode, and the core mode. This increases the negative dispersion with large absolute values generated by the core mode at the two resonant wavelengths. On the contrary, to increase $\Lambda$ has the opposite technical effect.

(2) The cladding is formed by the air holes with diameter d1 and their surrounding background material. It acts as both the porous structure to surround the core mode and the second-order defect mode, and part of the porous structure to surround the defect supermode. To control d1 will generate the following technical effects. Firstly, to set d1 largest among all the air holes makes the light energy more tightly confined in the direction around which the air holes in the cladding surround. The light energy of the adjacent fundamental defect mode first leaks out through the two air holes in the second-type defect, which locate at the third hexagonal porous layer surrounding the core. This enhances the coupling strength between the adjacent fundamental defect modes. Secondly, on this basis, to set d1 smaller than the working wavelength ensures that the light energy of the defect supermode and the second-order defect mode leaks to the core at the two resonant wavelengths. The two defect modes strongly resonate with the core mode. The core mode generates negative dispersion with large absolute values at both resonant wavelengths. Thirdly, in addition, to reduce d1 also increases the refractive index of the cladding and further raises the lower limit of the refractive indices of all core regions. The diameter and the area of the core regions where the core mode and the second-order defect mode are located are increased. As a result, the values of the refractive indices of the core mode, the defect supermode and the second-order defect mode are increased. This also reduces the absolute value of the slopes of the curves of the refractive indices to the red-shift of wavelength of three modes. On the contrary, to increase d1 has the opposite technical effect.

(3) 6 defect structures in the cladding are the same, whose centers locate at the vertices of hexagonal third-layer porous structure surrounding the core, respectively. The distribution and position of the defects will generate the following technical effects. Firstly, this invention has C6v symmetry with the center of the core as the midpoint, cause no birefringence in the core mode. Secondly, two adjacent second-type defects are in contact with each other without any air holes blocking in between. So, the totally 6 defects are structurally connected, and one annular defect core is formed. The value of the refractive index of the second-order defect mode is increased. The area of the core region of this mode is increased, which makes it much larger than the area of other core regions. As a result, this further reduces the absolute value of the slope of the curve of the refractive index to the red-shift of wavelength of the second-order defect mode, which results in bule shift of the second resonant wavelength. Thirdly, the path between the adjacent fundamental defect mode goes through only 2 layers of air holes in the second-type defects. The light energy of the adjacent fundamental defect mode leaks out through these two air holes. This enhances the coupling strength between the adjacent fundamental defect modes. As a result, the value of the refractive index of the defect supermode is increased. This also reduces the absolute value of the slope of the curve of the refractive index to the red-shift of wavelength of this mode, which results in bule shift of the first resonant wavelength. Fourthly, the path from the core region of the defect supermode to the core goes through 2 layers of air holes. The path from the core region of the second-order defect mode to the core goes through only 1 layer of air holes. Under the premise of two defect cores with complete structure, the defect supermode and the second-order defect mode strongly couple (or resonate) with the core mode. This results in negative dispersion with large absolute values at the two resonant wavelengths.

(4) The first-type defects are formed by the air holes with diameter d3 and their surrounding background material. It acts as both the core of the defect supermode, and part of the core region of the second-order defect mode. Each first-type defect includes 1 air hole with d3. Set d3 smallest among all air holes. The construction of the first-type defects will generate the following technical effects. Firstly, the refractive index of the first-type defects is larger than that of both the second-type defects and the cladding. As a result, each first-type defect acts as one defect core, while the second-type defect and the cladding work together as the porous structure surrounding this defect core. By this method, a kind of modes is formed within the first-type defects. Secondly, the refractive index of the first-type defects is smaller than that of the core, namely the refractive index of pure silica glass, which reduces the upper limit of the refractive indices of both defect supermode and second-order defect mode. This reduces the values of the refractive indices of the two defect modes, and further reduces the absolute value of the slopes of the curves of the refractive indices to the red-shift of wavelength of the two defect modes, which results in the red shift of the two resonant wavelengths. Thirdly, compared with the solid core, it weakens the ability of the defect core to confine light. This enhances the light energy of the defect modes to leak out. It has both the technical effects of enhancing the coupling strength between the adjacent fundamental defect modes and enhancing the coupling strength between the core mode and the two defect modes, namely the defect supermode and the second-order defect mode. The former increases the value of the refractive index of the defect supermode and reduces the absolute value of the slopes of the curves of the refractive index to the red-shift of wavelength of this mode, resulting in the blue shift of the first resonant wavelength. The latter increases negative dispersion with large absolute values in the core mode at the two resonant wavelengths.

(5) The second-type defects are formed by the air holes with diameter d2 and their surrounding background material. It acts as both part of the porous structure surrounding the defect supermode, and part of the core region of the second-order defect mode. Each second-type defect includes 6 air holes surrounding the first-type defect. d2 satisfies the relationship of d1>d2>d3. The construction of the second-type defects will generate the following technical effects. Firstly, d2 is larger than d3. The second-type defects can act as part of the porous structure surrounding the defect supermode. On this basis, to set d2 smaller than d1 makes the refractive index of the second-type defects larger than that of the cladding. As a result, the second-type defect and the cladding work together as the porous structure surrounding the defect supermode, which has the technical effect of raising the lower limit of the refractive index of the defect supermode. In addition, to set d2 smaller than d1 increases the diameter and the area of the core region of the defect supermode. In conclusion, to set d2 smaller than d1 increases the value of the refractive index of the defect supermode and reduces the absolute value of the slopes of the curves of the refractive index to the red-shift of wavelength of this mode, resulting in the blue shift of the first resonant wavelength. Secondly, d2 is smaller than d1. The second-type defects can act as part of the core region of the second-order defect mode. So, the totally 6 defects are structurally connected. Because of this, one annular defect core is formed, which increases the area of the second-order defect mode. This results in the increase of the refractive index of the second-order defect mode at longer wavelengths. The absolute value of the slopes of the curves of the refractive index to the red-shift of wavelength of the second-order defect mode is reduced, resulting in the blue shift of the second resonant wavelength. On this basis, to set d2 larger than d3 makes the refractive index of the second-type defects smaller than that of the first-type defects. As a result, the second-type defects and the first-type defects work together as the core has the technical effect of reducing the upper limit of the refractive index of the second-order defect mode. This reduces the value of the refractive index of the second-order defect mode and reduces the absolute value of the slope of the curve of the refractive index to the red-shift of wavelength of this mode, resulting in the red shift of the second resonant wavelength. Thirdly, because d2 is smaller than d1, the light energy of the defect core leaks out through the second-type defects. It has both the technical effects of enhancing the coupling strength between the adjacent fundamental defect modes and enhancing the coupling strength between the core mode and the defect supermode. The former increases the value of the refractive index of the defect supermode and reduces the absolute value of the slope of the curve of the refractive index to the red-shift of wavelength of this mode, resulting in the blue shift of the first resonant wavelength. The latter increases negative dispersion with large absolute values in the core mode at the first resonant wavelength. Because d2 is larger than d3, the average refractive index of the first-type defects and the second-type defects, averaged by their area ratio, is smaller than that of the first-type defects. This further weakens the ability of the defect core to confine light and enhances the energy of the second-order defect mode to leak to the core. It enhances the resonance strength between the second-order defect mode and the core mode. As a result, increase the negative dispersion with large absolute values generated by the core mode at the second resonant wavelength.

In conclusion, the defect structure proposed in this invention is symmetrically distributed at the 6 vertices of hexagonal third-layer porous structure surrounding the core. When each first-type defect acts as the core of the defect supermode and the second-type defect and the cladding work together as the porous structure surrounding this mode, a waveguide is formed. Meanwhile, when the first-type defects and the second-type defects work together as the core of the second-order defect mode and the cladding acts as the porous structure surrounding this mode, another waveguide is formed. By these method, one defect structure forms two different defect waveguides, in which the technical effect of generating the defect supermode and the second-order defect mode is achieved. By the combination actions of all the above technical schemes to control both the values of the refractive indices and slopes of the curves of the refractive indices to the red-shift of wavelength of the defect supermode and the second-order defect mode, the values of the refractive indices of the two defect modes are matched with that of the core mode, and the slopes of the curves of the refractive indices to the red-shift of wavelength of the two defect modes are mismatched with that of the core mode. As a result, the strong energy coupling occurs at the two resonant wavelengths. In other words, the curves of the refractive indices to the red-shift of wavelength of the two defect modes and the core mode are controlled to intersect at both resonant wavelengths respectively. The curves of the refractive indices to the red-shift of wavelength of the two defect modes and the core mode diverge fast at non-resonant wavelengths. This rapidly weakens the coupling strength of the two defect modes and the core mode. As a result, the core mode generates negative dispersion with large absolute values at both resonant wavelengths, and a DC-MSF is proposed.

Figure 2:
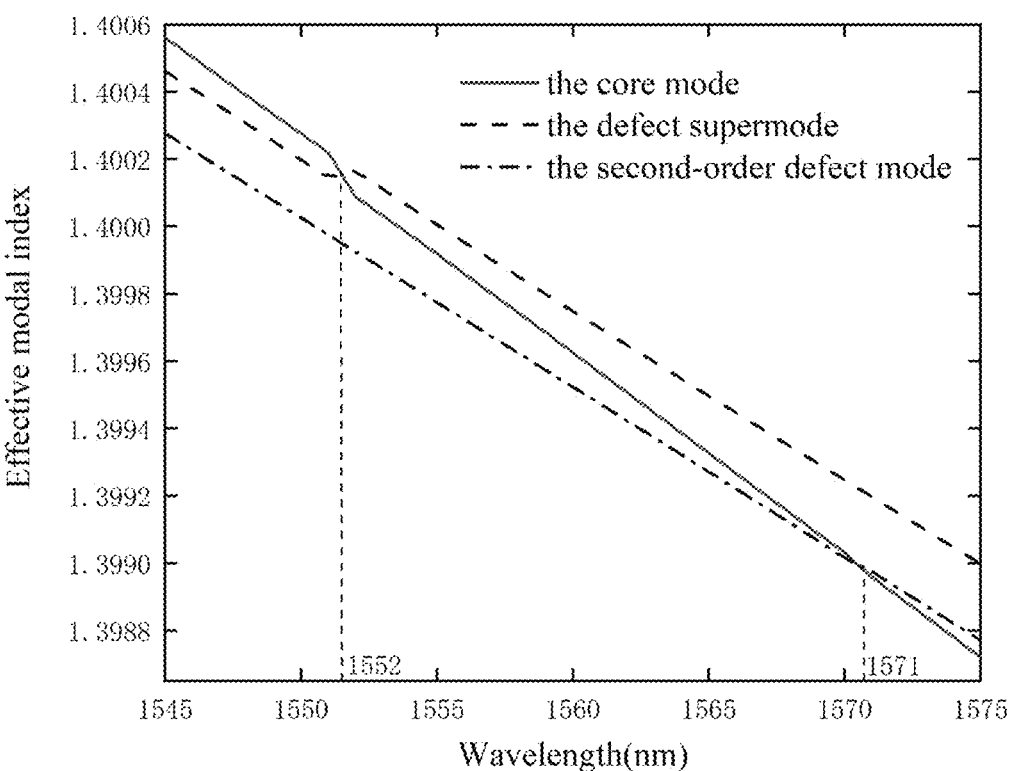
FIG. 2 shows the curves of the refractive indices to the red-shift of wavelength of the core mode, the defect supermode and the second-order defect mode according to one embodiment of the disclosure.
Figure 3:
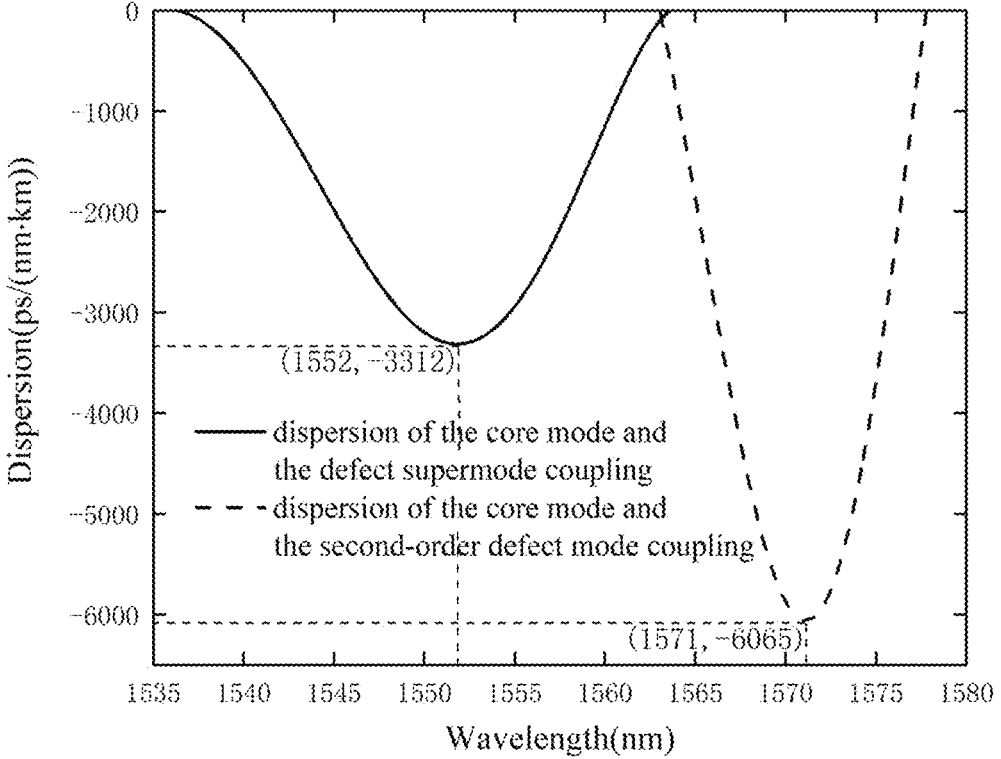
FIG. 3 shows the curves of the dispersion to the red-shift of wavelength of the core mode according to one embodiment of the disclosure.

As shown in FIG. 2, the curves of the refractive indices to the red-shift of wavelength of the two defect modes, namely the defect supermode and the second-order defect mode, and the core mode are controlled to intersect at both resonant wavelengths respectively. The curves of the refractive indices to the red-shift of wavelength of the defect supermode (or the second-order defect mode) and the core mode approach each other rapidly near the first (or second) resonant wavelength, which results in the rapid decrease of the difference between the two defect modes. The curves of the refractive indices to the red-shift of wavelength of the defect supermode (or the second-order defect mode) and the core mode diverge rapidly from the first (or second) resonant wavelength, which results in the rapid increase of the difference between the two defect modes. This rapidly weakens the coupling strength of the two defect modes and the core mode. As a result, the resonance causes sudden changes on the curve of the refractive index to the red-shift of wavelength of the core mode at both resonant wavelengths and their nearby wavelengths. This results in negative dispersion with large absolute values in the core mode at both resonant wavelengths. As shown in FIG. 3, The dispersion value of the core mode is −3312 ps/(nm·km) at 1552 nm. The dispersion value of the core mode is −6065 ps/(nm·km) at 1571 nm.

The above-mentioned embodiments are merely descriptions of the preferred embodiments about this invention. They do not limit the scope of this invention. If the practitioners in the field make various changes and improvements to the technical schemes of this invention without departing from the design spirit of this invention, these changes and improvements still fall within the protection scope determined by the claims of this invention.

What is claimed is:

1. A dispersion-compensation microstructure fiber using pure silica glass as a background material, comprising, a core, first-type defects, second-type defects and a cladding, wherein the core is a solid area formed by omitting 1 air hole;

air holes in a fiber cross section are arranged in an equilateral triangle lattice, with a spacing between adjacent air-holes being A; the first-type defects are formed by 6 air holes locating at vertices of hexagonal third-layer porous structure surrounding the core and their surrounding background material; a diameter of each of the 6 air holes is d3; the second-type defects are formed by the air holes in the first air-hole layer surrounding each defect of the first-type defects and their surrounding background material; the second-type defects include a total of 36 air holes each with a diameter d2; the cladding is formed by the air holes surrounding the core and the second-type defects and their surrounding background material; a diameter of the air holes in the cladding is d1; and d1>d2>d3;

wherein the spacing A is in a range of 1.98-2.02 μm.

2. The dispersion-compensation microstructure fiber according to claim 1, wherein the diameter d3 is in a range of 0.385-0.425 μm.

3. The dispersion-compensation microstructure fiber according to claim 1, wherein the diameter d2 is in a range of 0.99-1.03 μm.

4. The dispersion-compensation microstructure fiber according to claim 1, wherein the diameter d1 is in a range of 1.33-1.37 μm.

\* \* \* \* \*